United States Patent
Okubo

(10) Patent No.: US 11,047,332 B2
(45) Date of Patent: Jun. 29, 2021

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventor: Naoya Okubo, Chiryu (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 205 days.

(21) Appl. No.: 16/436,924

(22) Filed: Jun. 11, 2019

(65) Prior Publication Data
US 2020/0011261 A1    Jan. 9, 2020

(30) Foreign Application Priority Data
Jul. 5, 2018 (JP) .............................. JP2018-127988

(51) Int. Cl.
| | | |
|---|---|---|
| *F02D 41/30* | (2006.01) | |
| *F02D 41/18* | (2006.01) | |
| *F02N 11/08* | (2006.01) | |
| *F02D 41/08* | (2006.01) | |

(Continued)

(52) U.S. Cl.
CPC ......... *F02D 41/3094* (2013.01); *F02D 41/08* (2013.01); *F02D 41/182* (2013.01); *F02N 11/0818* (2013.01); *F02B 2075/125* (2013.01); *F02D 2041/224* (2013.01)

(58) Field of Classification Search
CPC .. F02B 2075/125; F02D 41/08; F02D 41/182; F02D 41/3094; F02D 2041/224; F02N 11/0818
See application file for complete search history.

(56) References Cited

U.S. PATENT DOCUMENTS

| | | | | |
|---|---|---|---|---|
| 7,347,175 B2* | 3/2008 | Lupo | ................... | F02N 11/0818 |
| | | | | 123/179.4 |
| 2013/0173103 A1 | 7/2013 | Ando et al. | | |
| 2018/0058359 A1* | 3/2018 | Kitada | ................ | F02D 41/2467 |

FOREIGN PATENT DOCUMENTS

| | | | | | |
|---|---|---|---|---|---|
| JP | 2013-139181 A | | 7/2013 | | |
| JP | 2014013032 A | * | 1/2014 | ......... | F02D 41/3094 |
| JP | 5776511 B2 | | 9/2015 | | |

OTHER PUBLICATIONS

Miyamoto, JP 2014-013032, machine translation. (Year: 2014).*

* cited by examiner

*Primary Examiner* — Hung Q Nguyen
*Assistant Examiner* — Mark L. Greene
(74) *Attorney, Agent, or Firm* — Hauptman Ham, LLP

(57) ABSTRACT

A controller for an internal combustion engine is configured to execute: a process of switching the injection mode according to an engine operational state; an anomaly determination process of determining whether there is an anomaly in the injection system that is implementing a single injection mode during implementation of the single injection mode; a provisional determination process of provisionally determining whether there may be an anomaly in the injection system that is implementing the single injection mode during the implementation of the single injection mode; and an idle determination process of, if it is determined that there is an anomaly in the provisional determination process, prohibiting the automatic stop and executing, during an idle operation, the anomaly determination process by implementing an injection mode that uses only the injection system provisionally determined to have an anomaly in the provisional determination process.

6 Claims, 6 Drawing Sheets

(51) Int. Cl.
*F02B 75/12* (2006.01)
*F02D 41/22* (2006.01)

CONTROLLER AND CONTROL METHOD FOR INTERNAL COMBUSTION ENGINE

RELATED APPLICATIONS

The present application claims priority of Japanese Application Number 2018-127988, filed on Jul. 5, 2018, the disclosure of which is hereby incorporated by reference herein in its entirety.

BACKGROUND

1. Field

The present disclosure relates to a controller and a control method for an internal combustion engine.

2. Description of Related Art

A typical type of internal combustion engine includes a direct injection system and a port injection system. The direct injection system has a direct injection valve, which injects fuel into the combustion chamber. The port injection system has a port injection valve, which injects fuel to the intake port. This engine performs automatic stop and automatic start.

In order to determine whether there is an anomaly in the direct injection system or the port injection system in such an internal combustion engine, the device disclosed in, for example, Japanese Laid-Open Patent Publication No. 2013-139181 executes the following anomaly determination process. In this anomaly determination process, a direct injection mode, in which fuel is injected only from the direct injection valve, is implemented in an operational state of a low engine load, for example, during an idle operation. During the implementation of the direct injection mode, it is determined whether there is an anomaly in the direct injection system based on an air-fuel correction amount in the implementation of the direct injection mode. Similarly, in an operational state of a low engine load, a port injection mode is implemented, in which fuel is injected only from the port injection valve, and it is determined whether there is an anomaly in the port injection system based on the air-fuel ratio correction amount in the implementation of the port injection mode.

In order to determine that there is an anomaly in the above anomaly determination process, it is necessary to continue the direct injection mode or the port injection mode to some extent. In the internal combustion engine in which the above-mentioned automatic stop control is performed, the engine operation is stopped during the idle operation. This reduces the opportunities for execution of the anomaly determination process. Thus, the device prohibits the performance of the automatic stop until the anomaly determination process for the direct injection system and the port injection system is completed.

However, since the performance of the automatic stop is prohibited until completion of the anomaly determination process for the direct injection system or the port injection system, the automatic stop cannot be performed until the anomaly determination process is completed even when the injection system, which is a direct injection system or a port injection system, is normal. Therefore, even when the injection systems are normal, the performance opportunities of the automatic stop will decrease, which may deteriorate, for example, the fuel economy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a controller for an internal combustion engine is provided. The engine includes a direct injection system having a direct injection valve, which injects fuel into a combustion chamber, and a port injection system having a port injection valve, which injects fuel to an intake port. The engine is configured to perform automatic stop. The controller being configured to: execute a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve; when the direct injection mode and the port injection mode are each defined as a single injection mode, execute an anomaly determination process of determining whether there is an anomaly in the injection system that is implementing the single injection mode during implementation of the single injection mode; execute a provisional determination process of provisionally determining whether there may be an anomaly in the injection system that is implementing the single injection mode during the implementation of the single injection mode; and if it is determined that there is an anomaly in the provisional determination process, execute an idle determination process of prohibiting the automatic stop and executing, during an idle operation, the anomaly determination process by implementing an injection mode that uses only the injection system provisionally determined to have an anomaly in the provisional determination process.

With this configuration, if it is provisionally determined that there may be an anomaly in the injection system through the provisional determination process, the automatic stop of the engine operation is prohibited in order to allow the idle operation to be performed. During the idle operation, the above-described anomaly determination process is executed by implementing the injection mode using only the injection system that has been determined to have an anomaly in the provisional determination process. Thus, the anomaly of the injection system that has been determined to have an anomaly in the provisional determination process is confirmed by redetermination of the injection system anomaly through the anomaly determination process.

In this configuration, when there is no anomaly in each of the direct injection system and the port injection system and these systems are thus determined to be normal, it is not provisionally determined that there is an anomaly in the injection systems, so that the automatic stop is not prohibited. Therefore, it is possible to limit decrease in opportunities of the automatic stop when the injection systems are normal. This limits deterioration of the fuel economy.

In the above-described controller, the anomaly determination process includes a process of measuring continuous time for which there is an anomaly in the injection system of the injection valve that is implementing the single injection mode and determining that there is an anomaly in the injection system when the continuous time exceeds a threshold. The provisional determination process includes a process of measuring accumulated time for which there is an anomaly in the injection system of the injection valve that is implementing the single injection mode and provisionally determining that there is an anomaly in the injection system when the accumulated time exceeds a threshold.

With this configuration, continuous time for which there is an anomaly in the injection system that is implementing the single injection mode is measured. When the measured continuous time exceeds a threshold, it is determined that there is an anomaly in this injection system. In this case, it is determined that there is an anomaly in the injection system based on the continuous time, which indicates that the anomaly continuously exists in the injection system. This allows the anomaly in the injection system to be able to be reliably determined.

In the provisional determination process, accumulated time for which there is an anomaly in the injection system that is implementing the single injection mode is measured. When the measured accumulated time exceeds a threshold, it is provisionally determined that there is an anomaly in this injection system. In the provisional determination process, in which an anomaly determination is performed based on the accumulated time, if there is an anomaly in the injection system, the accumulated time increases each time the single injection mode is implemented even if the implementation time of the single injection mode implemented based on the engine operational state is short. Therefore, the provisional determination process allows for a provisional determination as to whether there may be an anomaly in the injection system without prohibiting the automatic stop.

In the above-described controller, the provisional determination process includes a process of provisionally determining whether there may be an anomaly in the direct injection system during implementation of the direct injection mode, and a process of provisionally determining that there may be an anomaly in the port injection system during implementation of the port injection mode. The controller is configured to: execute the idle determination process when it is provisionally determined that there is an anomaly only in the direct injection system or only in the port injection system in the provisional determination process; during execution of the idle determination process, execute the anomaly determination process in the injection mode that uses only the injection system that has been provisionally determined to have an anomaly in the provisional determination process; and execute a process of cancelling the prohibition of the automatic stop if it is confirmed that there is an anomaly in the anomaly determination process that is executed during execution of the idle determination process.

With this configuration, when it is provisionally determined that there is an anomaly only in the direct injection system or only in the port injection system in the provisional determination process, the above-described idle determination process is executed. That is, the idle determination process is executed when it is provisionally determined that there is an anomaly in the direct injection system and the port injection system is normal or when it is determined that there is an anomaly in the port injection system and the direct injection system is normal. Thus, in this configuration, the provisional determination process can identify the injection system in which there may be an anomaly and the injection system that has no anomaly. When the idle determination process is executed, the anomaly determination process is executed only for the injection system in which there may be an anomaly, and the prohibition of the automatic stop is cancelled if it is confirmed that there is an anomaly in the anomaly determination process. As described above, in this configuration, the anomaly determination process needs to be performed only for one of the injection systems when executing the idle determination process. Therefore, the anomaly determination process in the idle determination process is terminated earlier than in a case in which the anomaly determination process is executed for both the direct injection system and the port injection system upon execution of the idle determination process. Accordingly, the time at which the automatic stop is canceled is made earlier. This shortens the period for which the automatic start is prohibited.

In the above-described controller, the provisional determination process includes a process of provisionally determining whether there may be an anomaly in the direct injection system during implementation of the direct injection mode, and a process of provisionally determining that there may be an anomaly in the port injection system during implementation of the port injection mode. The controller is configured to: execute the idle determination process when it is provisionally determined that there is an anomaly in one of the direct injection system and the port injection system in the provisional determination process; during execution of the idle determination process, execute the anomaly determination process in one of the direct injection mode and the port injection mode and thereafter execute the anomaly determination process in the other one of the direct injection mode and the port injection model; and execute a process of cancelling the prohibition of the automatic stop if it is confirmed that there is an anomaly in at least one of the direct injection system and the port injection system in the anomaly determination process that is executed during execution of the idle determination process.

With this configuration, the above-described idle determination process is executed when it is provisionally determined that there is an anomaly in the direct injection system or the port injection system in the provisional determination process. When the idle determination process is executed, the anomaly determination process is executed in one of the direct injection mode and the port injection mode. Then, the anomaly determination process is executed in the other one of the direct injection mode and the port injection mode. It is thus confirmed that there is an anomaly in the direct injection system or the port injection system. The prohibition of the automatic stop is cancelled when the anomaly determination process executed during the execution of the idle determination process confirms that there is an anomaly in at least one of the direct injection system and the port injection system.

When the idle determination process is executed in a state in which it is provisionally determined that there is an anomaly only in the direct injection system or in a state in which it is provisionally determined that there is an anomaly only in the port injection system, the idle determination process cannot be executed until it is determined that not only there is an anomaly in one of the direct injection system and the port injection system, but also there is no anomaly in the other one of the direct injection system and the port injection system. Therefore, there is a risk that the execution of the idle determination process will be delayed if there are few opportunities to execute the provisional determination process. The present embodiment executes the idle determination process when it is provisionally determined that there is an anomaly in the direct injection system or the port injection system. In this case, the idle determination process is executed when it is only determined that there is an anomaly in one of the direct injection system and the port injection system. This allows the idle determination process to be executed at an earlier time.

In a second general aspect, a control method for an internal combustion engine is provided. The engine includes a direct injection system having a direct injection valve, which injects fuel into a combustion chamber, and a port injection system having a port injection valve, which injects fuel to an intake port, the engine being configured to perform automatic stop. The method includes: a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve; an anomaly determination process of determining, when the direct injection mode and the port injection mode are each defined as a single injection mode, whether there is an anomaly in the injection system that is implementing the single injection mode during implementation of the single injection mode; a provisional determination process of provisionally determining whether there may be an anomaly in the injection system that is implementing the single injection mode during the implementation of the single injection mode; and an idle determination process of, if it is determined that there is an anomaly in the provisional determination process, prohibiting the automatic stop and executing, during an idle operation, the anomaly determination process by implementing an injection mode that uses only the injection system provisionally determined to have an anomaly in the provisional determination process.

In a third general aspect, a controller for an internal combustion engine is provided. The engine includes a direct injection system having a direct injection valve, which injects fuel into a combustion chamber, and a port injection system having a port injection valve, which injects fuel to an intake port, the engine being configured to perform automatic stop. The controller includes processing circuitry. The processing circuitry is configured to: execute a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve; when the direct injection mode and the port injection mode are each defined as a single injection mode, execute an anomaly determination process of determining whether there is an anomaly in the injection system that is implementing the single injection mode during implementation of the single injection mode; execute a provisional determination process of provisionally determining whether there may be an anomaly in the injection system that is implementing the single injection mode during the implementation of the single injection mode; and if it is determined that there is an anomaly in the provisional determination process, execute an idle determination process of prohibiting the automatic stop and executing, during an idle operation, the anomaly determination process by implementing an injection mode that uses only the injection system provisionally determined to have an anomaly in the provisional determination process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 30 for an internal combustion engine 11 according to a first embodiment will now be described with reference to FIGS. 1 to 7. The internal combustion engine 11 of the present embodiment is mounted on a vehicle.

Figure 1:
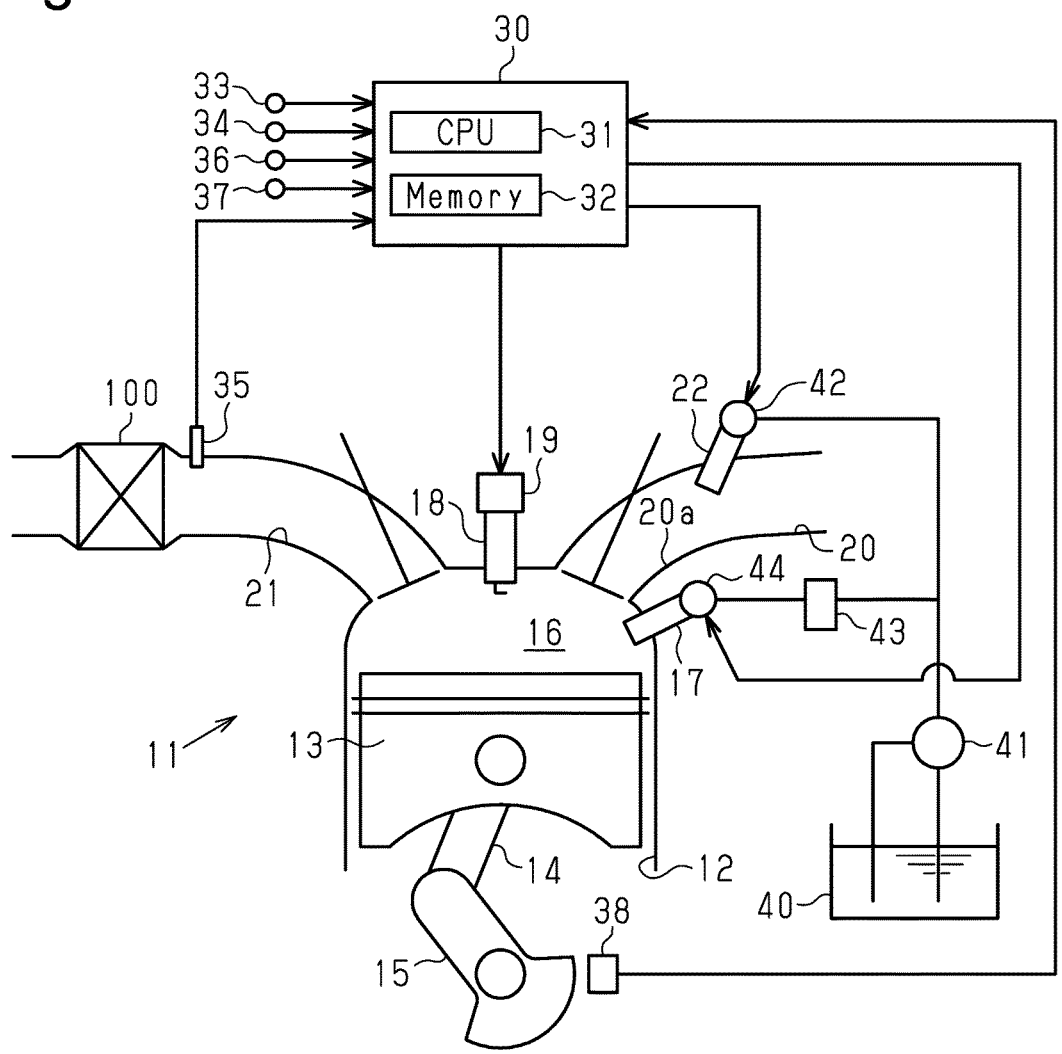
FIG. 1 is a schematic diagram showing the structure of an internal combustion engine in which a controller according to a first embodiment is used.

As shown in FIG. 1, the internal combustion engine 11 includes cylinders 12, in each of which a piston 13 is provided. The piston 13 is coupled to a crankshaft 15, which is the output shaft of the internal combustion engine 11, via a connecting rod 14 such that reciprocation of the piston 13 is converted into rotation of the crankshaft 15 by the connecting rod 14.

A combustion chamber 16 is defined in each cylinder 12 above the piston 13. The combustion chamber 16 is provided with an ignition plug 18, which ignites mixture of fuel and air. The ignition timing of the air-fuel mixture by the ignition plug 18 is adjusted by an igniter 19 provided above the ignition plug 18.

The combustion chamber 16 is continuous with an intake passage 20 and an exhaust passage 21. The intake passage 20 is provided with a throttle valve (not shown), which regulates the amount of air introduced into the combustion chamber 16, and the exhaust passage 21 is provided with a catalyst 100, which purifies exhaust gas when the air-fuel ratio of the air-fuel mixture is within a predetermined range. More specifically, when the air-fuel ratio of the air-fuel mixture is the stoichiometric air-fuel ratio, toxic components (mainly HC, CO, NOx) in the exhaust gas are effectively removed by the catalyst 100.

The intake passage 20 includes intake ports 20a, which constitute a part of the intake passage 20. Each intake port 20a is provided with a port injection valve 22, which injects fuel into the intake port 20a of each cylinder 12. The port injection valve 22 is connected to a low-pressure delivery pipe 42, and the low-pressure delivery pipe 42 is fed with fuel in a fuel tank 40 pumped up by a feed pump 41. In the present embodiment, the port injection valves 22, the low-pressure delivery pipe 42, the feed pump 41, and pipes connecting these components constitute a port injection system.

The internal combustion engine 11 is also provided with direct injection valves 17, each of which injects fuel into the corresponding combustion chamber 16. The direct injection valves 17 are connected to a high-pressure delivery pipe 44, which is connected to a high-pressure pump 43. The high-pressure pump 43 increases the pressure of fuel pumped up from the fuel tank 40 by the feed pump 41 and delivers the high-pressure fuel to the high-pressure delivery pipe 44. In the present embodiment, the direct injection valves 17, the high-pressure delivery pipe 44, the high-pressure pump 43, and pipes connecting these components constitute a direct injection system.

The controller 30 includes a central processing unit (hereinafter, referred to as a CPU) 31 and a memory 32, which stores programs and data that are used in control. The CPU 31 executes programs stored in the memory 32 to execute various types of engine control.

The controller 30 is connected to and receives signals from a crank angle sensor 38, which detects the rotational angle of the crankshaft 15, an accelerator sensor 33, which detects an accelerator operation amount ACCP, an air flowmeter 34, which detects an intake air amount GA. The controller 30 is also connected to and receives output signals from an air-fuel ratio sensor 35, a coolant temperature sensor 36, and a vehicle speed sensor 37. The air-fuel ratio sensor 35 is provided in the exhaust passage 21 on the upstream side of the catalyst 100. The coolant temperature sensor 36 detects the temperature of the engine coolant. The vehicle speed sensor 37 detects a vehicle speed SP of the vehicle provided with the internal combustion engine 11.

The controller 30 calculates an engine rotational speed NE based on an output signal Scr of the crank angle sensor 38. In addition, the controller 30 calculates an engine load factor KL based on the engine rotational speed NE and the intake air amount GA. The engine load factor KL is the ratio of the current cylinder inflow air amount to the cylinder inflow air amount when the internal combustion engine 11 is in a steady operational state with the throttle valve fully open at the current engine rotational speed NE. The cylinder inflow air amount is the amount of air that flows into each cylinder 12 in the intake stroke.

The controller 30 is configured to execute, as one of various types of controlling processes of the internal combustion engine 11, a process of switching among a direct injection mode, a port injection mode, and a dual injection mode according to the engine operational state. In the direct injection mode, fuel is injected only from the direct injection valves 17. In the port injection valve 22, fuel is injected only from the port injection valves 22. In the dual injection mode, fuel is injected from both the direct injection valves 17 and the port injection valves 22.

Figure 2:
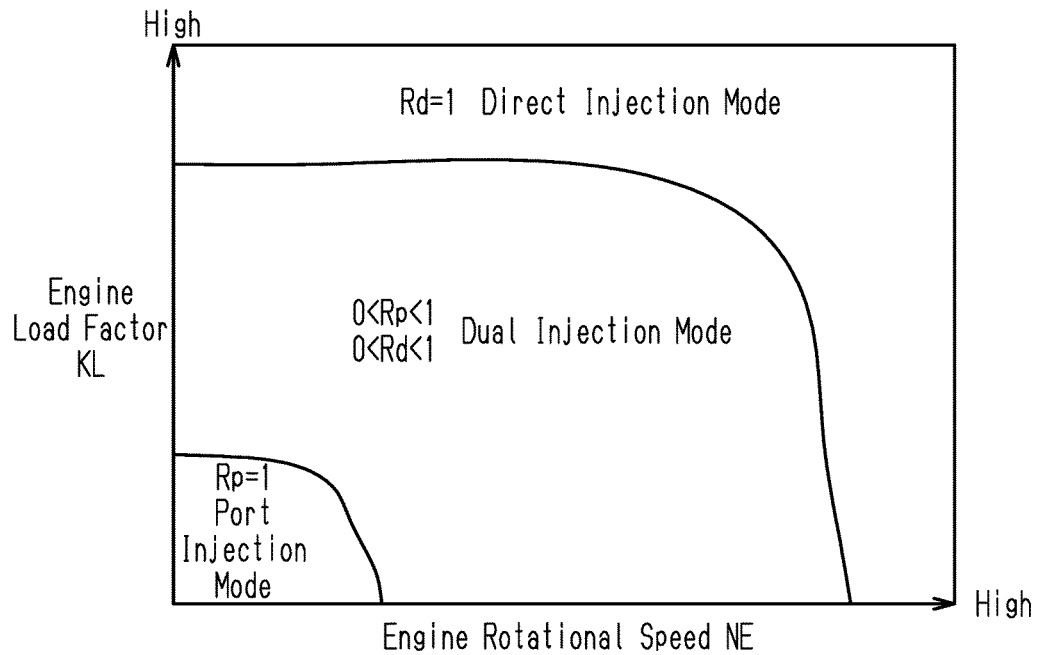
FIG. 2 is a conceptual diagram showing implementation regions of injection modes in the first embodiment.

As shown in FIG. 2, the controller 30 implements the port injection mode, for example, in a low rotational speed and low load region, the direct injection mode in a high load region and a high rotational speed region, and the dual injection mode in other engine operational regions. The use of each injection mode shown in FIG. 2 is one example and can be changed as appropriate. Also, in the following description, the direct injection mode and the port injection mode are each defined as a single injection mode.

The switching of the injection mode described above is performed by variably changing a port injection ratio Rp, which represents the ratio of the amount of fuel injected from the port injection valves 22 to the fuel injection amount Q, which is set based on the engine operational state.

The port injection ratio Rp is set variably within the range of $0 \leq Rp \leq 1$ based on the engine operational state such as an engine load factor KL and the engine rotational speed NE. The fuel injection amount obtained by multiplying the fuel injection amount Q by the port injection ratio Rp is set as the fuel injection amount of the port injection valves 22. The value obtained by subtracting the port injection ratio Rp from 1 is calculated as a direct injection ratio Rd, which represents the ratio of the fuel injection amount from the direct injection valves 17 to the fuel injection amount Q (Rd=1−Rp). Then, the fuel injection amount of the direct injection valve 17 is set to the fuel injection amount obtained by multiplying the fuel injection amount Q by the direct injection ratio Rd.

In the case shown in FIG. 2, the port injection ratio Rp is set to 1 and the direct injection ratio Rd is set to 0 in the low load and low rotational speed region such as during idle operation. Also, the port injection ratio Rp is set to 0 and the direct injection ratio Rd is set to 1 in the high load region and the high rotational speed region. In other engine operational regions, the port injection ratio Rp is set variably within the range of $0 < Rp < 1$. Accordingly, the direct injection ratio Rd is set variably. By setting the port injection ratio Rp variably in accordance with the engine operational state in the above described manner, the direct injection ratio Rd is also automatically set in a variable manner.

The controller 30 is configured to execute an automatic stop control process and an automatic start control process as part of various types of controlling processes of the internal combustion engine 11. In the automatic stop control process, the controller 30 performs automatic stop of the internal combustion engine 11 when a predetermined automatic stop condition is satisfied. In the automatic start control process, the controller 30 performs automatic start of the internal combustion engine 11 when a predetermined automatic start condition is satisfied. In the present embodiment, the automatic stop condition is set to a condition in which the accelerator operation amount ACCP is 0, the vehicle speed SP is 0, and the internal combustion engine 11 has been warmed up. Accordingly, even if the accelerator pedal is not depressed and the idle operation condition is satisfied, the internal combustion engine 11 is automatically stopped without performing the idle operation. Also, the automatic start condition is set to a condition in which the accelerator operation amount ACCP is greater than or equal to a specified value during the automatic stop. Accordingly, if the accelerator pedal is depressed during the automatic stop, the internal combustion engine 11 is automatically started.

The controller 30 performs, as one of various types of controlling processes of the internal combustion engine 11, an air-fuel ratio feedback control of calculating an air-fuel ratio correction value FAF, which corrects the fuel injection amount Q, based on an air-fuel ratio Af detected by the air-fuel ratio sensor 35 and a target air fuel ratio Aft. In the air-fuel ratio feedback control, the controller 30 calculates the air-fuel ratio correction value FAF such that the deviation between the air-fuel ratio Af and the target air-fuel ratio Aft decreases. Specifically, the controller 30 calculates, as the air-fuel ratio correction value FAF, the sum of a proportional element, an integral element, and a differential element, which are obtained by inputting the deviation between the target air-fuel ratio Aft and the air-fuel ratio Af.

The controller 30 is configured to execute, as one of various types of controlling processes of the internal combustion engine 11, an anomaly determination process of determining whether there is an anomaly in the injection system that is implementing the single injection mode during the implementation of the single injection mode.

Figure 3:
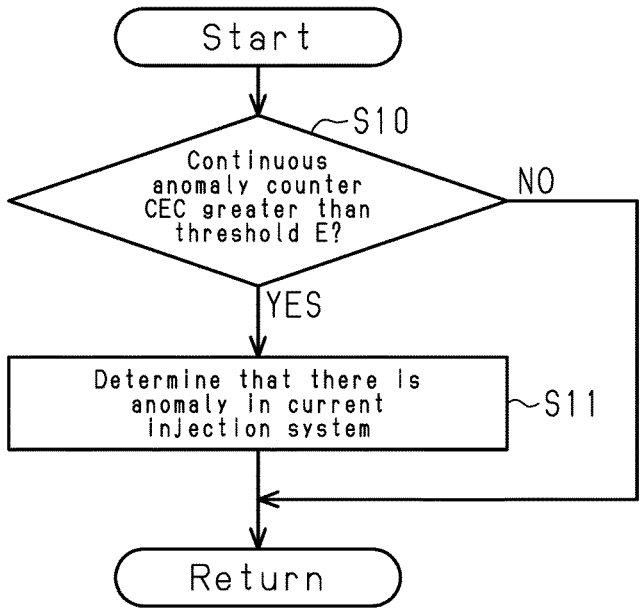
FIG. 3 is a flowchart showing the procedure of an anomaly determination process of the first embodiment.

FIG. 3 shows the procedure of the anomaly determination process. The process shown in FIG. 3 is implemented by the CPU 31 executing programs stored in the memory 32 of the controller 30. The anomaly determination process is repeatedly executed at predetermined intervals during the engine operation. In the following description, the number of each step is represented by the letter S followed by a numeral.

When this process is started, the CPU 31 of the controller 30 determines whether the current value of a continuous anomaly counter CEC is greater than a threshold E (S10). The continuous anomaly counter CEC is a measurement of the continuous time for which there is an anomaly in the injection system of the injection valve in the single injection mode and is calculated by the CPU 31. Specifically, the continuous anomaly counter CEC is incrementally increased when the air-fuel ratio correction value FAF during the implementation of the single injection mode is anomalous under the condition that the following conditions (A) and (B) are satisfied. That is, the continuous anomaly counter CEC is incrementally increased when the air-fuel ratio correction value FAF has a value outside a predetermined range in which the air-fuel ratio correction value FAF is determined to be normal, for example, when the air-fuel ratio correction value FAF is excessively great or small.

Condition (A): the air-fuel ratio feedback control is being performed.

Condition (B): the internal combustion engine 11 has been warmed up.

The continuous anomaly counter CEC is reset to 0 when the injection mode is changed or when the process of S11, which will be discussed below, is executed.

Also, the threshold E is set to such a value that it can be reliably determined that there is an anomaly in the injection system that is currently implementing the single injection mode based on the fact that the continuous anomaly counter CEC is greater than the threshold E.

The CPU 31 temporarily ends this process when determining that the current continuous anomaly counter CEC is less than or equal to the threshold E (S10: NO).

When determining that the current continuous anomaly counter CEC is greater than the threshold E (S10: YES), the CPU 31 determines that there is an anomaly in the injection system that is implementing the current single injection mode S11). For example, if the currently implemented single injection mode is the direct injection mode, the CPU 31 determines that there is an anomaly in the direct injection system. In contrast, if the currently implemented single injection mode is the port injection mode, the CPU 31 determines that there is an anomaly in the port injection system. The CPU 31 then temporarily ends this process.

In order to determine that there is an anomaly in the injection system in the above-described anomaly determination process, the direct injection mode or the port injection mode needs to be continuously implemented until the continuous anomaly counter CEC exceeds a threshold E. However, as shown in FIG. 2, the direct injection mode is implemented in an operational region that is not often used during a normal operation, such as a high load operation or a high rotational speed operation. The port injection mode is implemented in an operational region that is often used during a normal operation such as the idle operation. The port injection mode thus has many opportunities to detect an anomaly in the port injection system in the anomaly determination process during a normal operation. However, in the internal combustion engine 11, which performs the automatic stop control described above, the idle operation is often skipped, which reduces the opportunities to detect an anomaly in the port injection system through the anomaly determination process.

In this regard, the controller 30 of the present embodiment executes a provisional determination process of provisionally determining whether there may be an anomaly in the injection system that is implementing the single injection mode during the implementation of the single injection mode. If it is determined that there is an anomaly in the provisional determination process, the controller 30 executes an idle determination process of prohibiting the automatic stop and executing, during the idle operation, the above-described anomaly determination process by implementing an injection mode using only the injection system provisionally determined to have an anomaly in the provisional determination process. During the idle operation, the temperature in the combustion chamber is lower than in other operations, and thus adhesion of deposit, which easily occurs when the direct injection mode is implemented, and thermal damages to the direct injection valve, which easily occurs when the port injection mode is implemented, are limited. Therefore, there would be few drawbacks even if the direct injection mode or the port injection mode is implemented during the idle operation.

The provisional determination process and idle determination process will now be described below.

The provisional determination process includes a process of provisionally determining whether there may be an anomaly in the port injection system during the implementation of the port injection mode (provisional determination process related to the port injection system) and a process of provisionally determining whether there may be an anomaly in the direct injection system during the implementation of the direct injection mode (provisional determination process related to the direct injection system). The provisional determination process includes a provisional determination process related to the port injection system and a provisional determination process related to the direct injection system.

Figure 4:
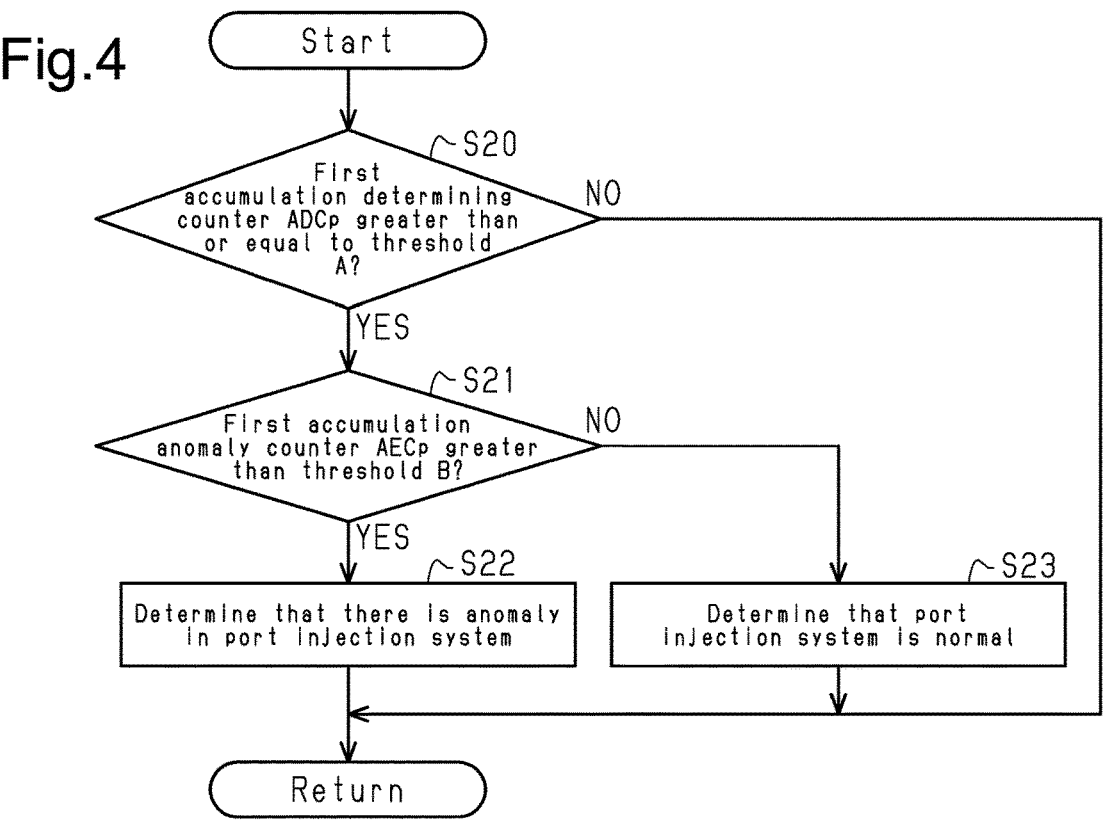
FIG. 4 is a flowchart showing the procedure of a provisional determination process for the port injection system of the first embodiment.

FIG. 4 shows the procedure of the provisional determination process related to the port injection system. The process shown in FIG. 4 is executed by the CPU 31 executing programs stored in the memory 32 of the controller 30 at predetermined intervals.

When this process is started, the CPU 31 of the controller 30 determines whether the current value of a first accumulation determining counter ADCp is greater than or equal to a threshold A (S20). The first accumulation determining counter ADCp is a value calculated by the CPU 31 and is incrementally increased when the conditions (C) and (D), which are discussed below, in addition to the above-described conditions (A) and (B) are all satisfied.

Condition (C): Specified time (for example, several hundreds of milliseconds) has elapsed since the injection mode is switched.

Condition (D): The port injection mode is being implemented.

The first accumulation determining counter ADCp holds the current value when any one of the conditions (A), (B), (C), and (D) is no longer satisfied. Therefore, the first accumulation determining counter ADCp is a value representing an accumulated value of time for which the conditions (A), (B), (C), and (D) are all satisfied during the engine operation. The first accumulation determining counter ADCp is reset to 0 when the ignition switch of the vehicle is turned off.

The threshold A is set to such a value that it can be reliably determined that the port injection system is normal based on a negative determination of the process of S21, which will be discussed below, in a state in which the first accumulation determining counter ADCp is greater than or equal to the threshold A. The threshold A is set to a greater value than a threshold B, which will be discussed below.

The CPU 31 temporarily ends this process when determining that the current first accumulation determining counter ADCp is less than the threshold A (S20: NO).

When determining that the current first accumulation determining counter ADCp is greater than or equal to the threshold A (S20: YES), the CPU 31 determines whether the current value of a first accumulation anomaly counter AECp is greater than the threshold B (S21). The first accumulation anomaly counter AECp is a measurement of the accumulated time for which there is an anomaly in the port injection system, in which the port injection mode is implemented, and is calculated by the CPU 31. Specifically, the first accumulation anomaly counter AECp is incrementally increased when the air-fuel ratio correction value FAF during the implementation of the port injection mode is anomalous under the condition that the conditions (A) to (D) are all satisfied. That is, the first accumulation anomaly counter AECp is incrementally increased when the air-fuel ratio correction value FAF has a value outside a predetermined range in which the air-fuel ratio correction value FAF is determined to be normal, for example, when the air-fuel ratio correction value FAF is excessively great or small. The first accumulation anomaly counter AECp is reset to 0 when the ignition switch of the vehicle is turned off.

Also, the threshold B is set to such a value that it can be reliably determined that there may be an anomaly in the port injection system that is currently implementing the port injection mode based on the fact that the first accumulation anomaly counter AECp is greater than the threshold B. In the present embodiment, the above threshold B is set to a value greater than the threshold E, but the relationship between the threshold B and the threshold E may be changed as necessary.

When determining that the current first accumulation anomaly counter AECp is less than or equal to the threshold B (S21: NO), the CPU 31 determines that the port injection system is normal (S23) and temporarily ends this process.

When determining that the current first accumulation anomaly counter AECp is greater than the threshold B (S21: YES), the CPU 31 provisionally determines that there is an anomaly in the port injection system (S22) and temporarily ends this process.

Figure 5:
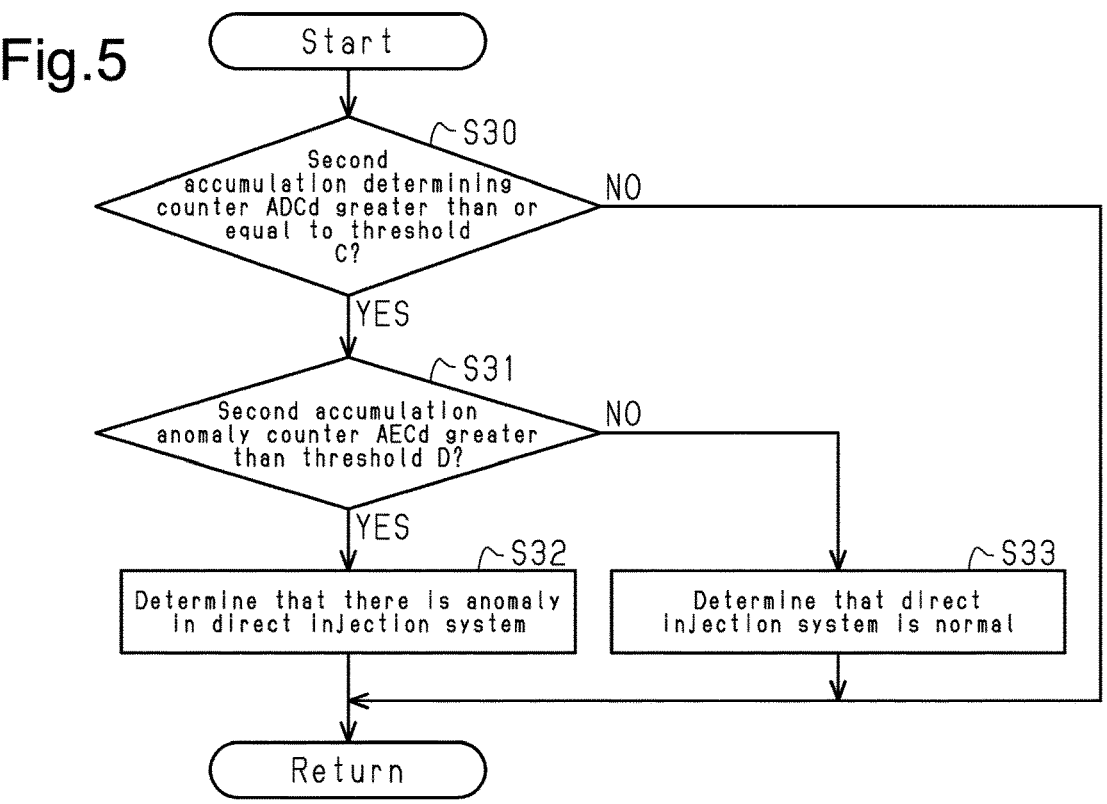
FIG. 5 is a flowchart showing the procedure of a provisional determination process for the direct injection system of the first embodiment.

FIG. 5 shows the procedure of the provisional determination process related to the direct injection system. The process shown in FIG. 5 is also executed by the CPU 31 executing programs stored in the memory 32 of the controller 30 at predetermined intervals.

When this process is started, the CPU 31 of the controller 30 determines whether the current value of a second accumulation determining counter ADCd is greater than or equal to a threshold C (S30). The second accumulation determining counter ADCd is a value calculated by the CPU 31 and is incrementally increased when the condition (E), which is discussed below, in addition to the above-described conditions (A) to (C) are all satisfied.

Condition (E): The direct injection mode is being implemented.

The second accumulation determining counter ADCd holds the current value when any one of the conditions (A), (B), (C), and (E) is no longer satisfied. Therefore, the second accumulation determining counter ADCd is a value representing an accumulated value of time for which the conditions (A), (B), (C), and (E) are all satisfied during the engine operation. The second accumulation determining counter ADCd is reset to 0 when the ignition switch of the vehicle is turned off.

The threshold C is set to such a value that it can be reliably determined that the direct injection system is normal based on a negative determination of the process of S31, which will be discussed below, in a state in which the second accumulation determining counter ADCd is greater than or equal to the threshold C. The threshold C is set to a greater value than a threshold D, which will be discussed below. In the present embodiment, the threshold C is the same value as the threshold A. However, the threshold C may be different from the threshold A.

The CPU 31 temporarily ends this process when determining that the current second accumulation determining counter ADCd is less than the threshold C (S30: NO).

When determining that the current second accumulation determining counter ADCd is greater than or equal to the threshold C (S30: YES), the CPU 31 determines whether the current value of a second accumulation anomaly counter AECd is greater than the threshold D (S31). The second accumulation anomaly counter AECd is a measurement of the accumulated time for which there is an anomaly in the direct injection system, in which the direct injection mode is implemented, and is calculated by the CPU 31. Specifically, the second accumulation anomaly counter AECd is incrementally increased when the air-fuel ratio correction value FAF during the implementation of the direct injection mode is anomalous under the condition that the conditions (A), (B), (C), and (E) are all satisfied. That is, the second accumulation anomaly counter AECd is incrementally increased when the air-fuel ratio correction value FAF has a value outside a predetermined range in which the air-fuel ratio correction value FAF is determined to be normal, for example, when the air-fuel ratio correction value FAF is excessively great or small. The second accumulation anomaly counter AECd is reset to 0 when the ignition switch of the vehicle is turned off.

Also, the threshold D is set to such a value that it can be reliably determined that there may be an anomaly in the direct injection system that is currently implementing the direct injection mode based on the fact that the second accumulation anomaly counter AECd is greater than the threshold D. In the present embodiment, the threshold D is set to the same value as the threshold B. However, the threshold D may be different from the threshold B.

When determining that the current second accumulation anomaly counter AECd is less than or equal to the threshold D (S31: NO), the CPU 31 determines that the direct injection system is normal (S33) and temporarily ends this process.

When determining that the current second accumulation anomaly counter AECd is greater than the threshold D (S31: YES), the CPU 31 provisionally determines that there is an anomaly in the direct injection system (S32) and temporarily ends this process.

The determination results of the provisional determination process shown in FIGS. 4 and 5 are cleared, for example, when the ignition switch of the vehicle is turned off.

Figure 6:
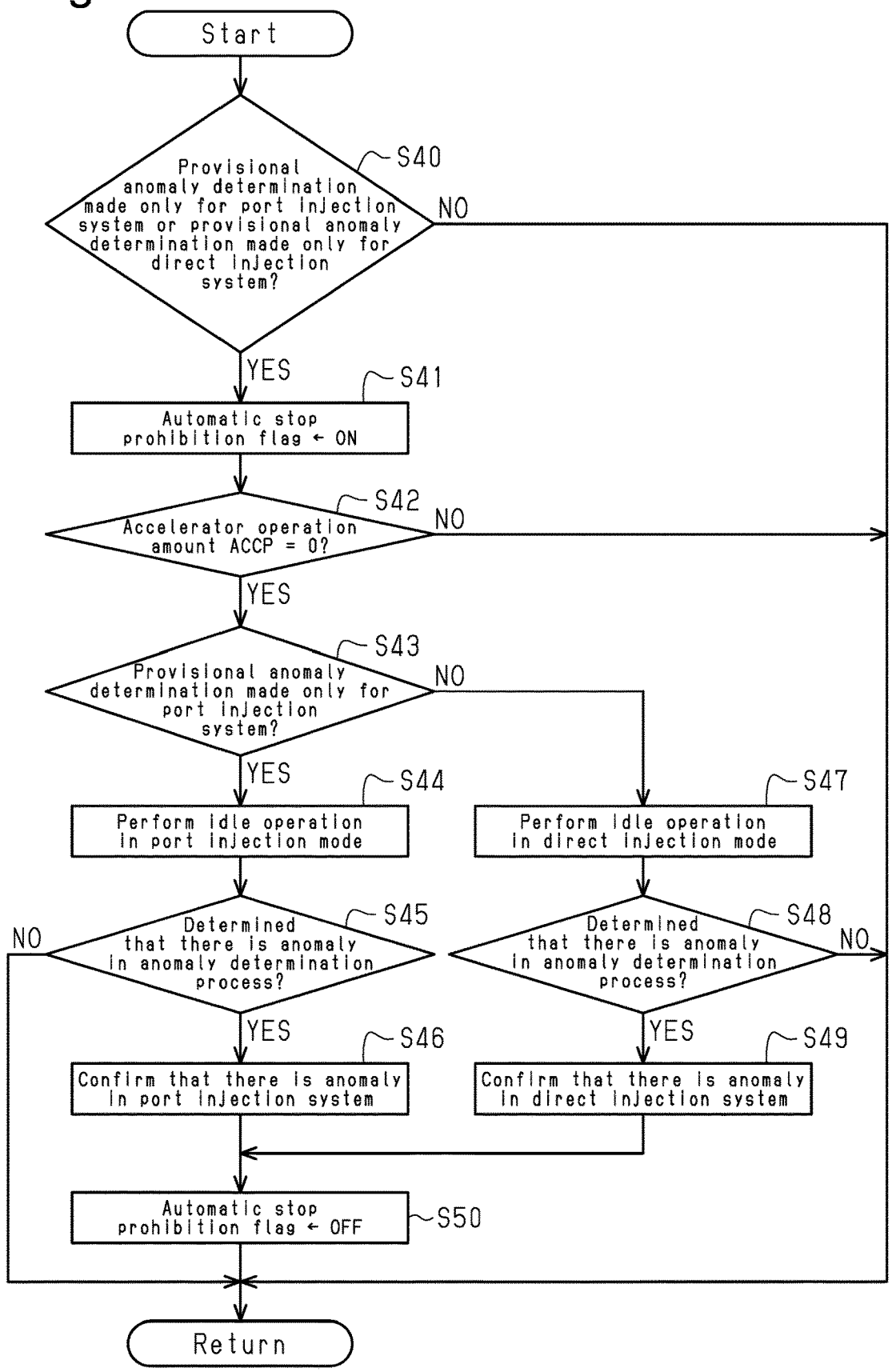
FIG. 6 is a flowchart showing a series of processes including idle determination process of the first embodiment.

FIG. 6 shows a series of processes including the above-described idle determination process. The process shown in FIG. 6 is also implemented by the CPU 31 executing programs stored in the memory 32 of the controller 30. This series of processes is repeatedly executed at predetermined intervals except when it is determined that there is an anomaly in both the port injection system and the direct injection system in the anomaly determination process described above.

When this process is started, the CPU 31 of the controller 30 determines whether a provisional anomaly determination has been made only for the port injection system, or whether a provisional anomaly determination has been made only for the direct injection system (S40). The state in which "a provisional anomaly determination has been made only for the port injection system" means that it is provisionally determined that there is an anomaly only in the port injection system in the above-described provisional determination process, that is, it is provisionally determined that there is an anomaly in the port injection system and that the direct injection system is normal. This is a state in which the process of S22 of FIG. 4 and the process of S33 of FIG. 5 have both been executed. The state in which "a provisional anomaly determination has been made only for the direct injection system" means that it is provisionally determined that there is an anomaly only in the direct injection system in the above-described provisional determination process, that is, it is provisionally determined that there is an anomaly in the direct injection system and that the port injection system is normal. This is a state in which the process of S23 of FIG. 4 and the process of S32 of FIG. 5 have both been executed.

If the determination of S40 is negative, the CPU 31 temporarily ends this process.

If the CPU 31 determines that a provisional anomaly determination has been made only for the port injection system or that a provisional anomaly determination has been made only for the direct injection system in S40 (S40: YES), the CPU 31 executes the processes of S41 to S49 as the idle determination process.

In the process of S41, the CPU 31 sets an automatic stop prohibition flag, which is initially set to OFF, to ON (S41). When the automatic stop prohibition flag is set to ON, the controller 30 prohibits the performance of the automatic stop.

Next, the CPU 31 determines whether the accelerator operation amount ACCP is 0 (S42). Then, when determining that the accelerator operation amount ACCP is not 0 (S42: NO), the CPU 31 temporarily ends this process.

When determining that the accelerator operation amount ACCP is 0 (S42: YES), the CPU 31 determines whether a provisional anomaly determination has been made only for the port injection system (S43).

If the CPU 31 determines that a provisional anomaly determination has been made only for the port injection system (S43: YES), the CPU 31 performs the idle operation in the port injection mode (S44).

Next, the CPU 31 executes the anomaly determination process during the idle operation started in S44, and determines whether the port injection system is determined to have an anomaly in the anomaly determination process (S45). Then, if it is determined that there is no anomaly in the port injection system in the anomaly determination process (S45: NO), the CPU 31 temporarily ends this process.

If it is determined that there is an anomaly in the port injection system in the anomaly determination process (S45: YES), the CPU 31 confirms that there is an anomaly in the port injection system (S46) and sets the automatic stop prohibition flag to OFF (S50). The CPU 31 then temporarily ends this process.

If it is determined that a provisional anomaly determination has not been made only for the port injection system in S43, that is, if a provisional anomaly determination has been made only for the direct injection system (S43: NO), the CPU 31 performs idle operation in the direct injection mode (S47).

Next, the CPU 31 executes the anomaly determination process during the idle operation started in S47, and determines whether the direct injection system is determined to have an anomaly in the anomaly determination process (S48). Then, if it is determined that there is no anomaly in the direct injection system in the anomaly determination process (S48: NO), the CPU 31 temporarily ends this process.

If it is determined that there is an anomaly in the direct injection system in the anomaly determination process (S48: YES), the CPU 31 confirms that there is an anomaly in the direct injection system (S49) and sets the automatic stop prohibition flag to OFF (S50). The CPU 31 then temporarily ends this process.

Figure 7:
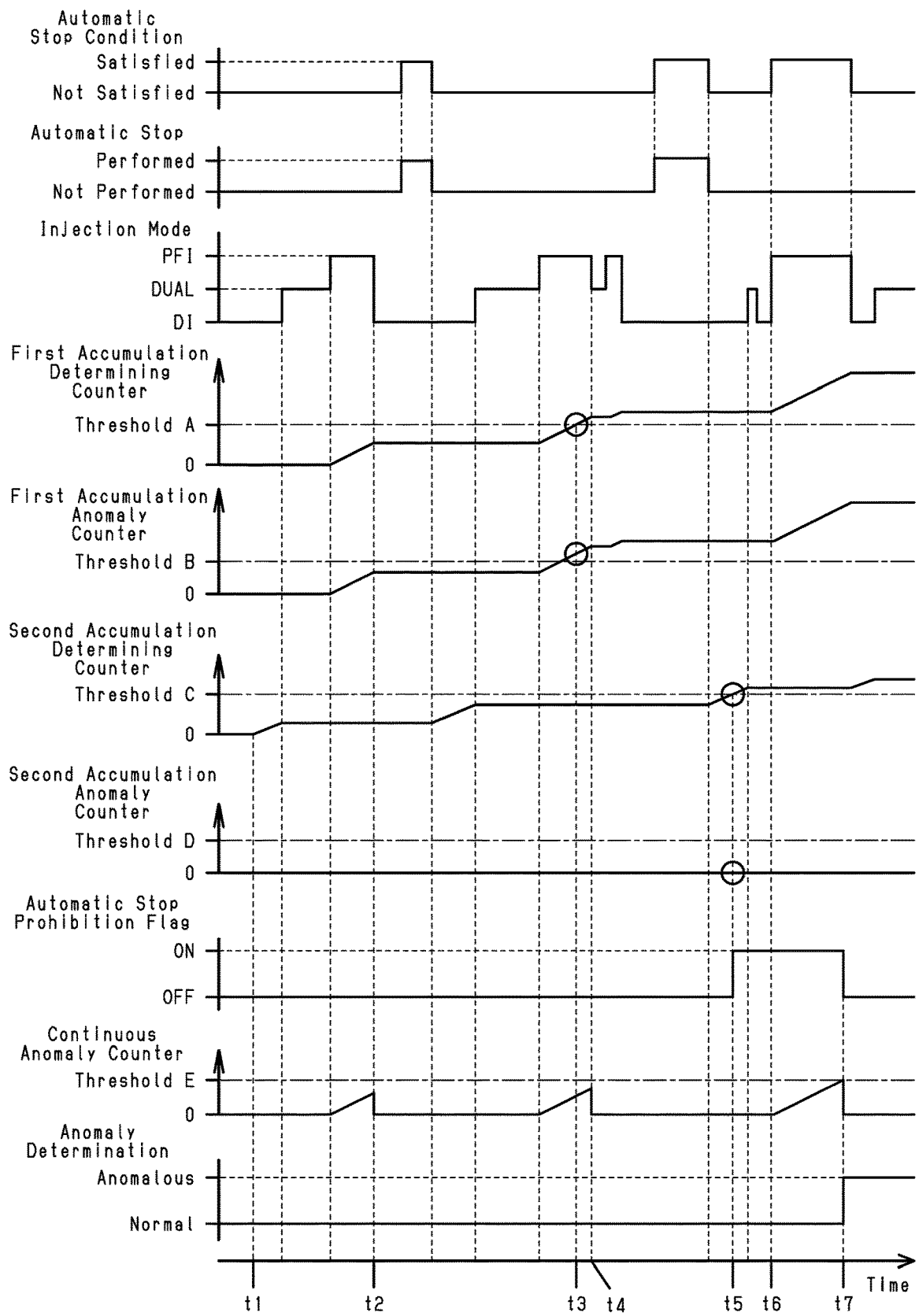
FIG. 7 is a timing diagram showing an operation of the first embodiment.

FIG. 7 shows one example of the operation of the above-described provisional determination process and idle determination process. FIG. 7 shows an example in which there is an anomaly in the port injection system, and the direct injection system is normal. Also, PFI in the injection mode in FIG. 7 represents the port injection mode, DUAL represents the dual injection mode, and DI represents the direct injection mode.

After the engine starting process is initiated at a point in time t1, the value of the continuous anomaly counter CEC increases with time while both the conditions (A) and (B) are satisfied, and the air-fuel ratio correction value FAF during the implementation of the single injection mode is anomalous. In this case, the air-fuel ratio correction value FAF during the implementation of the direct injection mode is not anomalous since the direct injection system is normal. Therefore, the value of continuous anomaly counter CEC is maintained at 0 during the implementation of the direct injection mode. In contrast, since there is an anomaly in the port injection system, the air-fuel ratio correction value FAF during the implementation of the port injection mode is anomalous. Therefore, the value of the continuous anomaly counter CEC increases with time during the implementation of the port injection mode. However, if the injection mode is switched from the port injection mode to another injection mode (point in time t2 or point in time t4) before the value of the continuous anomaly counter CEC exceeds the threshold E, the continuous anomaly counter CEC is reset to 0, and the port injection system is not determined to have an anomaly.

After the engine starting process is initiated at the point in time t1, the value of the first accumulation determining counter ADCp increases with time while the above-described conditions (A) to (D) are all satisfied. When any one of the above conditions (A) to (D) is no longer satisfied, the value of the first accumulation determining counter ADCp is maintained as it is. When the above conditions (A) to (D) are all satisfied again, the value of the first accumulation determining counter ADCp increases again.

Also, after the engine starting process is initiated at the point in time t1, the value of the first accumulation anomaly counter AECp increases with time if the above-described conditions (A) to (D) are all satisfied, and the air-fuel ratio correction value FAF during the implementation of the port injection mode is anomalous. If any one of the above-described conditions (A) to (D) is no longer satisfied, or if the air-fuel ratio correction value FAF during the implementation of the port injection mode is not anomalous, the first accumulation determining counter ADCp stops being incrementally increased and is maintained as it is. When the above-described conditions (A) to (D) are all satisfied again and the air-fuel ratio correction value FAF during the implementation of the port injection mode is anomalous, the value of the first accumulation determining counter ADCp increases with time again.

When the first accumulation determining counter ADCp becomes greater than or equal to the threshold A, the CPU 31 provisionally determines that there is an anomaly in the port injection system if the first accumulation anomaly counter AECp is greater than the threshold B (point in time t3).

After the engine starting process is initiated at the point in time t1, the value of the second accumulation determining counter ADCd increases with time while the above-described conditions (A) to (C) and (E) are all satisfied. When any one of the above conditions (A) to (C) and (E) is no longer satisfied, the value of the second accumulation determining counter ADCd is maintained as it is. When the above conditions (A) to (C) and (E) are all satisfied again, the value of the second accumulation determining counter ADCd increases again.

After the engine starting process is initiated at the point in time t1, the value of the second accumulation anomaly counter AECd increases with time if the above-described conditions (A) to (C) and (E) are all satisfied, and the air-fuel ratio correction value FAF during the implementation of the direct injection mode is anomalous. In this case, the air-fuel ratio correction value FAF during the implementation of the direct injection mode is not anomalous since the direct injection system is normal. Therefore, even if the above-described conditions (A) to (C) and (E) are all satisfied, the value of the second accumulation anomaly counter AECd is maintained at 0 since the air-fuel ratio correction value FAF during the implementation of the direct injection mode is not anomalous.

If the second accumulation anomaly counter AECd is less than or equal to the threshold D when the second accumulation determining counter ADCd becomes greater than or equal to the threshold C (point in time t5), the CPU 31 determines that the direct injection system is normal. As a result, only the port injection system is provisionally determined to have an anomaly, and the automatic stop prohibition flag is changed from OFF to ON.

After the automatic stop prohibition flag is changed to ON, the idle operation is started without performing the automatic stop of the internal combustion engine even if the automatic stop condition is satisfied (point in time t6). At this time, the idle operation is performed in the injection mode that uses only the injection system that has been provisionally determined to have an anomaly in the provisional determination process, that is, in this example, the port injection mode. The above-described anomaly determination process is executed during this idle operation. Then, if the continuous anomaly counter CEC calculated during this idle operation exceeds the threshold E (point in time t7), the port injection system is determined to have an anomaly, so that it is confirmed that the port injection system has an anomaly. Then, since the automatic stop prohibition flag is changed from ON to OFF, the automatic stop will be performed when the automatic stop condition is satisfied from the next time onwards.

The present embodiment as described above achieves the following advantages.

(1) The provisional determination process is executed to provisionally determine whether there may be an anomaly in the injection system that is implementing the single injection mode during the implementation of the single injection mode such as the port injection mode and the direct injection mode. If it is provisionally determined that there may be an anomaly in the injection system through the provisional determination process, the automatic stop of the engine operation is prohibited to allow the idle operation to be performed. During the idle operation, the above-described anomaly determination process is executed by implementing the injection mode using only the injection system that has been determined to have an anomaly in the provisional determination process. Thus, the anomaly of the injection system that has been determined to have an anomaly in the provisional determination process is confirmed by redetermination of the injection system anomaly through the anomaly determination process.

In the present embodiment, when there is no anomaly in each of the direct injection system and the port injection system and these systems are determined to be normal, it is not provisionally determined that there is an anomaly in the injection systems, so that the automatic stop is not prohibited. Therefore, it is possible to limit decrease in opportunities of the automatic stop when the injection systems are normal. This, for example, limits deterioration of fuel economy.

(2) In the above-described anomaly determination process, the continuous anomaly counter CEC is measured, which is continuous time for which there is an anomaly in the injection system that is implementing the single injection mode. When the continuous anomaly counter CEC exceeds a threshold E, it is determined that there is an anomaly in this injection system. In this case, it is determined that there is an anomaly in the injection system based on the continuous anomaly counter CEC, which indicates that the anomaly continuously exists in the injection system. This allows the anomaly in the injection system to be reliably determined.

In the provisional determination process described above, the first accumulation anomaly counter AECp and the second accumulation anomaly counter AECd are measured, which are accumulated time for which there is an anomaly in the injection system of the injection valve implementing the single injection mode. It is then provisionally determined that there is an anomaly in the port injection system if the first accumulation anomaly counter AECp exceeds the threshold B. Also, it is provisionally determined that there is an anomaly in the direct injection system if the second accumulation anomaly counter AECd exceeds the threshold D. In the provisional determination process, in which an anomaly determination is performed based on the accumulated time, if there is an anomaly in the injection system, the first accumulation anomaly counter AECp and the second accumulation anomaly counter AECd, which are accumulated time, increase each time the single injection mode is implemented even if the implementation time of the single injection mode implemented based on the engine operational state is short. Therefore, the provisional determination process allows for a provisional determination as to whether there may be an anomaly in the injection system without prohibiting the automatic stop.

(3) When it is provisionally determined that there is an anomaly only in the direct injection system or only in the port injection system in the provisional determination process, the above-described idle determination process is executed. Thus, in the present embodiment, the execution of the provisional determination process can identify the injection system in which there may be an anomaly and the injection system that has no anomaly. When the idle determination process is executed, the anomaly determination process is executed only for the injection system in which there may be an anomaly, and the prohibition of the automatic stop is cancelled if it is confirmed that there is an anomaly in the anomaly determination process. As described above, in the present embodiment, the anomaly determination process needs to be performed only for one of the direct injection system and the port injection system when executing the idle determination process. Therefore, the anomaly determination process in the idle determination process is terminated earlier than in a case in which the anomaly determination process is executed for both the direct injection system and the port injection system upon execution of the idle determination process. Accordingly, the time at which the automatic stop is canceled is made earlier. This shortens the period for which the automatic start is prohibited.

Second Embodiment

A controller 30 for an internal combustion engine according to a second embodiment will now be described with reference to FIG. 8. The present embodiment and the above-described embodiment differ in a series of processes including the idle determination process shown in FIG. 6. The controller according to the present embodiment will be described focusing on these differences.

Figure 8:
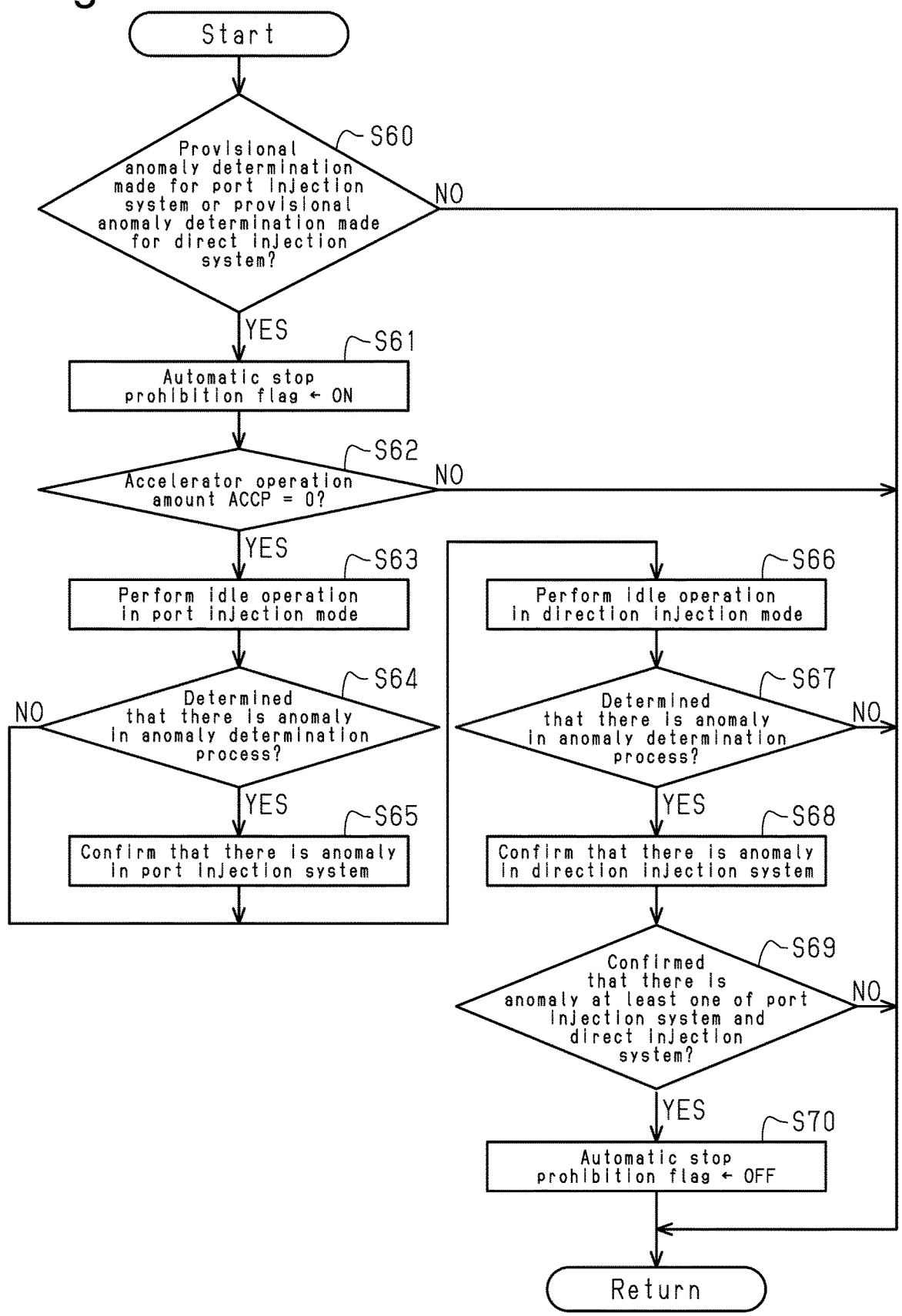
FIG. 8 is a flowchart showing a series of processes including an idle determination process of a controller for an internal combustion engine according to a second embodiment.

FIG. 8 shows a series of processes including the idle determination process executed by the controller 30 of the present embodiment. The process shown in FIG. 8 is also implemented by the CPU 31 executing programs stored in the memory 32 of the controller 30. This series of processes is repeatedly executed at predetermined intervals except when it is determined that there is an anomaly in both the port injection system and the direct injection system in the anomaly determination process described above.

When this process is started, the CPU 31 of the controller 30 determines whether a provisional anomaly determination has been made for the port injection system, or whether a provisional anomaly determination has been made for the direct injection system (S60). The state in which "a provisional anomaly determination has been made for the port injection system" refers to a state in which it has been provisionally determined that there is an anomaly in the port injection system in the above-described provisional determination process. This also refers to a state in which the process of S22 of FIG. 4 has been executed. The state in which "a provisional anomaly determination has been made for the direct injection system" refers to a state in which it has been provisionally determined that there is an anomaly in the direct injection system in the above-described provisional determination process. This also refers to a state in which the process of S32 of FIG. 5 has been executed.

If the determination of S60 is negative, the CPU 31 temporarily ends this process.

If the CPU 31 determines that a provisional anomaly determination has been made for the port injection system or that a provisional anomaly determination has been made for the direct injection system in S60 (S60: YES), the CPU 31 executes the processes of S61 to S69 as the idle determination process.

In the process of S61, the CPU 31 sets an automatic stop prohibition flag, which is initially set to OFF, to ON (S61). When the automatic stop prohibition flag is set to ON, the controller 30 prohibits the performance of the automatic stop.

Next, the CPU 31 determines whether the accelerator operation amount ACCP is 0 (S62). Then, when determining that the accelerator operation amount ACCP is not 0 (S62: NO), the CPU 31 temporarily ends this process.

When determining that the accelerator operation amount ACCP is 0 (S62: YES), the CPU 31 performs the idle operation in the port injection mode (S63).

Next, the CPU 31 executes the anomaly determination process during the idle operation started in S63, and determines, within a predetermined time DT, whether the port injection system is determined to have an anomaly in the anomaly determination process (S64). The time DT is set to be slightly longer than the time corresponding to the above-described threshold E. Then, if it is determined that there is an anomaly in the port injection system in the anomaly determination process (S64: YES), the CPU 31 confirms that there is an anomaly in the port injection system (S65). If it is determined that there is no anomaly in the port injection system in the anomaly determination process (S64: NO), or if the process of S65 is executed, the CPU 31 performs the idle operation in the direct injection mode (S66).

Next, the CPU 31 executes the anomaly determination process during the idle operation started in S66, and determines whether the direct injection system is determined to have an anomaly in the anomaly determination process within the time DT (S67). Then, if it is determined that there is no anomaly in the direct injection system in the anomaly determination process (S67: NO), the CPU 31 temporarily ends this process.

If it is determined that there is an anomaly in the direct injection system in the anomaly determination process (S67: YES), the CPU 31 confirms that there is an anomaly in the direct injection system (S68).

Next, the CPU 31 determines whether at least one of the port injection system and the direct injection system has been confirmed to have an anomaly (S69). In S69, the CPU 31 makes an affirmative determination when at least one of the process of S65 and the process of S68 has been executed.

Then, if at least one of the port injection system and the direct injection system has not been confirmed to have an anomaly (S69: NO), the CPU 31 temporarily ends this process. If at least one of the port injection system and the direct injection system has been confirmed to have an anomaly (S69: YES), the CPU 31 sets the automatic stop prohibition flag to OFF (S70) and temporarily ends this process.

In addition to the above-described advantages (1) and (2), the second embodiment has the following advantage.

(4) The above-described idle determination process is executed when it is provisionally determined that there is an anomaly in the direct injection system or the port injection system in the provisional determination process. When the idle determination process is executed, the above-described anomaly determination process is executed in the direct injection mode after the above-described anomaly determination process is executed in the port injection mode, so that it is confirmed that there is an anomaly in the direct injection system or the port injection system. The prohibition of the automatic stop is cancelled when the anomaly determination process executed during the execution of the idle determination process confirms that there is an anomaly in at least one of the direct injection system and the port injection system.

As described above with reference to the first embodiment, when the idle determination process is executed in a state in which it is provisionally determined that there is an anomaly only in the direct injection system or in a state in which it is provisionally determined that there is an anomaly only in the port injection system, the idle determination process cannot be executed until it is determined that not only there is an anomaly in one of the direct injection system and the port injection system, but also there is no anomaly in the other one of the direct injection system and the port injection system. Therefore, there is a risk that the execution of the idle determination process will be delayed if there are few opportunities to execute the provisional determination process. The present embodiment executes the idle determination process when it is provisionally determined that there is an anomaly in the direct injection system or the port injection system. In this case, the idle determination process is executed when it is only determined that there is an anomaly in one of the direct injection system and the port injection system. This allows the idle determination process to be executed at an earlier time.

The above-described embodiments may be modified as follows. The above-described embodiments and the following modifications can be combined as long as the combined modifications remain technically consistent with each other.

In the provisional determination process related to the port injection system shown in FIG. 4, the first accumulation determining counter ADCp is calculated as a value representing the accumulated value of the time for which the conditions (A), (B), (C), and (D) are all satisfied during the engine operation. Also, the first accumulation anomaly counter AECp is calculated as a value representing the accumulated time for which there is an anomaly in the port injection system, which is implementing the port injection mode. Alternatively, a continuous time for which the conditions (A), (B), (C), and (D) are all satisfied during the engine operation may be measured, and the measured continuous time may be compared with a predetermined threshold F to determine whether to execute the process of S21. Then, a continuous time for which there is an anomaly in the port injection system, which is implementing the port injection mode, may be measured, and the measured continuous time may be compared with a predetermined threshold G to determine whether to execute the process of S22 or the process of S23. In this modification, setting the threshold G to a value smaller than the threshold E allows the provisional determination process to provisionally determine that there may be an anomaly in the port injection system before the determination of an anomaly by the anomaly determination process is confirmed.

Likewise, in the provisional determination process related to the direct injection system shown in FIG. 5, the second accumulation determining counter ADCd is calculated as a value representing the accumulated value of the time for which the conditions (A), (B), (C), and (E) are all satisfied during the engine operation. Also, the second accumulation anomaly counter AECd is calculated as a value representing the accumulated time for which there is an anomaly in the direct injection system, which is implementing the direct injection mode. Alternatively, a continuous time for which the conditions (A), (B), (C), and (E) are all satisfied during the engine operation may be measured, and the measured continuous time may be compared with a predetermined threshold H to determine whether to execute the process of S31. Then, a continuous time for which there is an anomaly in the direct injection system, which is implementing the direct injection mode, may be measured, and the measured continuous time may be compared with a predetermined threshold K to determine whether to execute the process of S32 or the process of S33. In this modification, setting the threshold K to a value smaller than the threshold E allows the provisional determination process to provisionally determine that there may be an anomaly in the direct injection system before the determination of an anomaly by the anomaly determination process is confirmed.

In the second embodiment above, the idle operation is performed in the direct injection mode after the idle operation is performed in the port injection mode. Alternatively, the idle operation may be performed in the port injection mode after the idle operation is performed in the direct injection mode.

In the provisional determination process related to the port injection system shown in FIG. 4, the process of S20 may be omitted, and the provisional determination process may be temporarily ended if a negative determination is made in S21. Even in this case, if there may be an anomaly in the port injection system, it is possible to provisionally determine that there is an anomaly in the port injection system.

Likewise, in the provisional determination process related to the direct injection system shown in FIG. 5, the process of S30 may be omitted, and the provisional determination process may be temporarily ended if a negative determination is made in S31. Even in this case, if there may be an anomaly in the direct injection system, it is possible to provisionally determine that there is an anomaly in the direct injection system.

An anomaly determination process similar to the anomaly determination process described in FIG. 3 may be executed during the implementation of the dual injection mode. That is, if, in a state in which the conditions (A) and (B) are both satisfied, the air-fuel ratio correction value FAF during the implementation of the dual injection mode is out of a range in which it is determined to be normal, the value of the continuous anomaly counter CEC for the dual injection mode is incrementally increased. When the continuous anomaly counter CEC for the dual injection mode is greater than or equal to the threshold E, it may be determined that there is an anomaly in at least one of the direct injection system and the port injection system that are performing the dual injection mode.

The controller 30 is not limited to a device that includes the CPU 31 and the memory 32 and executes software processing. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine including a direct injection system having a direct injection valve, which injects fuel into a combustion chamber, and a port injection system having a port injection valve, which injects fuel to an intake port, the internal combustion engine being configured to perform automatic stop, the controller being configured to
execute a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve,
when the direct injection mode and the port injection mode are each defined as a single injection mode, execute an anomaly determination process of determining whether there is an anomaly in the injection system that is implementing the single injection mode during implementation of the single injection mode,
execute a provisional determination process of provisionally determining whether there may be an anomaly in the injection system that is implementing the single injection mode during the implementation of the single injection mode, and
if it is determined that there is an anomaly in the provisional determination process, execute an idle determination process of prohibiting the automatic stop and executing, during an idle operation, the anomaly determination process by implementing an injection mode that uses only the injection system provisionally determined to have an anomaly in the provisional determination process.

2. The controller for an internal combustion engine according to claim 1, wherein
the anomaly determination process includes a process of measuring continuous time for which there is an anomaly in the injection system of the injection valve that is implementing the single injection mode and determining that there is an anomaly in the injection system when the continuous time exceeds a threshold, and
the provisional determination process includes a process of measuring accumulated time for which there is an anomaly in the injection system of the injection valve that is implementing the single injection mode and provisionally determining that there is an anomaly in the injection system when the accumulated time exceeds a threshold.

3. The controller for an internal combustion engine according to claim 1, wherein
the provisional determination process includes
a process of provisionally determining whether there may be an anomaly in the direct injection system during implementation of the direct injection mode, and
a process of provisionally determining that there may be an anomaly in the port injection system during implementation of the port injection mode, and
the controller is configured to
execute the idle determination process when it is provisionally determined that there is an anomaly only in the direct injection system or only in the port injection system in the provisional determination process,
during execution of the idle determination process, execute the anomaly determination process in the injection mode that uses only the injection system that has been provisionally determined to have an anomaly in the provisional determination process, and
execute a process of cancelling the prohibition of the automatic stop if it is confirmed that there is an anomaly in the anomaly determination process that is executed during execution of the idle determination process.

4. The controller for an internal combustion engine according to claim 1, wherein
the provisional determination process includes
a process of provisionally determining whether there may be an anomaly in the direct injection system during implementation of the direct injection mode, and
a process of provisionally determining that there may be an anomaly in the port injection system during implementation of the port injection mode, and
the controller is configured to
execute the idle determination process when it is provisionally determined that there is an anomaly in one of the direct injection system and the port injection system in the provisional determination process,
during execution of the idle determination process, execute the anomaly determination process in one of the direct injection mode and the port injection mode and thereafter execute the anomaly determination process in the other one of the direct injection mode and the port injection mode, and
execute a process of cancelling the prohibition of the automatic stop if it is confirmed that there is an anomaly in at least one of the direct injection system and the port injection system in the anomaly determination process that is executed during execution of the idle determination process.

5. A control method for an internal combustion engine, the internal combustion engine including a direct injection system having a direct injection valve, which injects fuel into a combustion chamber, and a port injection system having a port injection valve, which injects fuel to an intake port, the engine being configured to perform automatic stop, the control method comprising:
- a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve;
- an anomaly determination process of determining, when the direct injection mode and the port injection mode are each defined as a single injection mode, whether there is an anomaly in the injection system that is implementing the single injection mode during implementation of the single injection mode;
- a provisional determination process of provisionally determining whether there may be an anomaly in the injection system that is implementing the single injection mode during the implementation of the single injection mode; and
- an idle determination process of, if it is determined that there is an anomaly in the provisional determination process, prohibiting the automatic stop and executing, during an idle operation, the anomaly determination process by implementing an injection mode that uses only the injection system provisionally determined to have an anomaly in the provisional determination process.

6. A controller for an internal combustion engine, the internal combustion engine including a direct injection system having a direct injection valve, which injects fuel into a combustion chamber, and a port injection system having a port injection valve, which injects fuel to an intake port, the engine being configured to perform automatic stop, wherein
the controller comprises processing circuitry, and
the processing circuitry is configured to
- execute a process of switching, according to an engine operational state, among a direct injection mode, in which fuel is injected only from the direct injection valve, a port injection mode, in which fuel is injected only from the port injection valve, and a dual injection mode, in which fuel is injected from both the direct injection valve and the port injection valve,
- when the direct injection mode and the port injection mode are each defined as a single injection mode, execute an anomaly determination process of determining whether there is an anomaly in the injection system that is implementing the single injection mode during implementation of the single injection mode,
- execute a provisional determination process of provisionally determining whether there may be an anomaly in the injection system that is implementing the single injection mode during the implementation of the single injection mode, and
- if it is determined that there is an anomaly in the provisional determination process, execute an idle determination process of prohibiting the automatic stop and executing, during an idle operation, the anomaly determination process by implementing an injection mode that uses only the injection system provisionally determined to have an anomaly in the provisional determination process.

* * * * *